United States Patent [19]

Smith

[11] Patent Number: 4,483,406
[45] Date of Patent: Nov. 20, 1984

[54] MOUNTING FOR CONNECTING A CROSSBAR TO A CRAWLER TRACTOR TRACK FRAME

[75] Inventor: Joseph J. Smith, Dubuque, Iowa
[73] Assignee: Deere & Company, Moline, Ill.
[21] Appl. No.: 445,319
[22] Filed: Nov. 29, 1982
[51] Int. Cl.³ .............................................. B62D 55/08
[52] U.S. Cl. ..................................... 180/9.5; 180/9.6; 384/206; 384/209
[58] Field of Search ...................... 180/9.5, 9.52, 9.54, 180/9.56, 9.58, 9.6; 308/4 R; 384/192, 206, 209

[56] References Cited

U.S. PATENT DOCUMENTS 2,135,619  11/1938  Johnston .............................. 180/9.6
2,988,159   6/1961  Weber ................................. 180/9.5

FOREIGN PATENT DOCUMENTS 437796  11/1935  United Kingdom ................ 180/9.6

Primary Examiner—Joseph F. Peters, Jr.
Assistant Examiner—Mitchell J. Hill

[57] ABSTRACT

Alternate embodiments of mountings are shown which include ball and ball socket segments arranged to permit universal pivoting movement between the track frame and crossbar of a crawler tractor. The arrangement further includes planar surfaces carried by the track frame or crossbar engaged with planar surfaces formed on one or the other of the ball and ball socket segments so that the end of the crossbar is permitted to slide fore-and-aft and sideways relative to the track frame.

5 Claims, 7 Drawing Figures

MOUNTING FOR CONNECTING A CROSSBAR TO A CRAWLER TRACTOR TRACK FRAME

BACKGROUND OF THE INVENTION

The present invention relates to mountings for connecting equalizer bars to the track frames of track-laying tractors.

Track frames of track-laying tractors extend fore-and-aft along opposite sides of the tractor main frame and are connected to the latter for vertical pivotal movement about an axis which is coincident with that of final drive sprockets mounted at the rear end of the main frame. The forward ends of these track frames are interconnected by a crossbar or equalizer bar which extends transversely beneath and is pivoted medially of its ends to the main frame for pivotal movement about a fore-and-aft axis. Because the track frames and the crossbar are mounted for pivoting about different axes, the connection between the track frames and the bar must not only permit relative pivotal movement between the frames and the crossbar but also must permit the ends of the crossbar to shift both lengthwise and crosswise relative to the track frames if undue stresses are to be avoided at the connections. One known attempt at a structure for permitting such shifting movement of the crossbar ends is disclosed in U.S. Pat. No. 2,988,159 granted to Weber on June 13, 1961. Specifically, Weber shows a crossbar having cylindrical ends which are each slidably and rotatably mounted in a crossbar provided in a fore-and-aft extending cylindrical trunnion member, which is in turn rotatably and axially shiftably mounted in a bushing fixed to a respective track frame. In order for the sliding movements of the bar end and the cylindrical trunnion member to be free, the trunnion member must be disposed very nearly perpendicular to the pivot axis of the frame and at the same time very nearly parallel to the pivot axis of the equalizer bar. Thus, it is imperative that the trunnion member be precisely oriented which of course requires that close tolerances be kept.

SUMMARY OF THE INVENTION

According to the present invention there is provided an improved universal mounting for connecting an end of a crossbar to a track frame.

The following and other objects are accomplished by several embodiments of mountings which each comprise a pair of ball segments received in a pair of ball socket segments with one or the other of the ball and ball socket segments being fixed to one and having a planar slidable interface with the other of upper and lower suport members, carried by the track frame, and the end of the crossbar.

A broad object of the invention is to provide a universal mounting for connecting a crossbar end to a crawler tractor track frame such that precise orientation of the mounting is not required for ensuring relatively free sliding movement between elements making up the mounting.

A more specific object of the invention is to provide a universal mounting, as set forth in the previous object, wherein the elements making up the mounting include a pair of ball socket segments having a pair of ball segments received therein, with one of the ball and ball socket segments being fixed to one of upper and lower frame supports and opposite sides of the crossbar end and with the other of the ball and ball socket segments having respective planar surfaces slidably engaged with planar surfaces of the other of the frame supports and crossbar end.

A further object of the invention is to provide a crossbar having upper and lower cylindrical recesses formed therein for loosely receiving cylindrical portions of upper and lower ball segments whereby side loading on one track frame will be transferred to the main frame and other track frame by way of the crossbar.

These and other objects will become apparent from a reading of the ensuing description together with the appended drawings.

DESCRIPTION OF THE PREFERRED EMBODIMENTS

Figure 1:
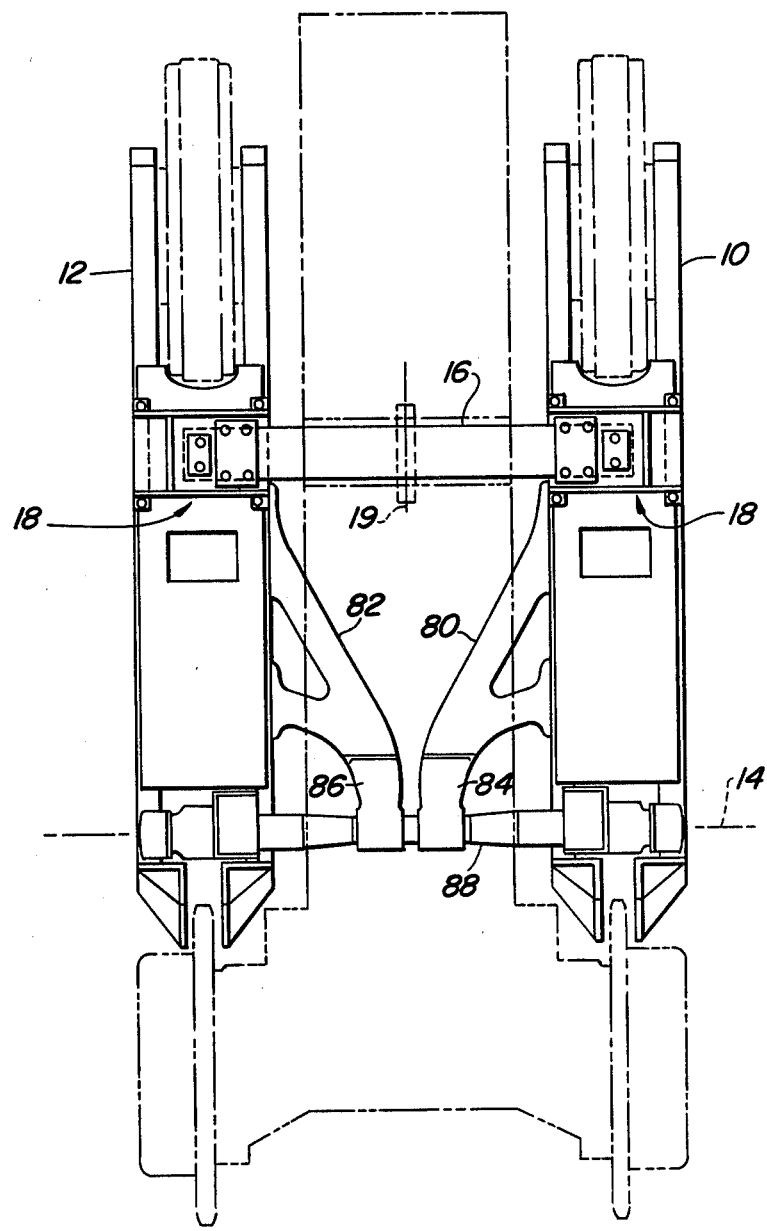
FIG. 1 is a top plan view showing a crossbar and track frame combination with which the present invention is particularly adapted for use.

Referring now to FIG. 1, therein is shown a pair of transversely spaced, longitudinally extending crawler tractor track frames 10 and 12 having their rear ends mounted for pivoting about a horizontal, transverse axis 14. Extending between the frames 10 and 12 at a location spaced a considerable distance forwardly of the axis is a crossbar or equalizer bar 16 having opposite ends universally connected to the frames by mountings 18. The crossbar 16 is pivotally mounted medially of its ends to a main frame of a crawler tractor for movement about a horizontal, fore-and-aft axis 19.

Figure 2:
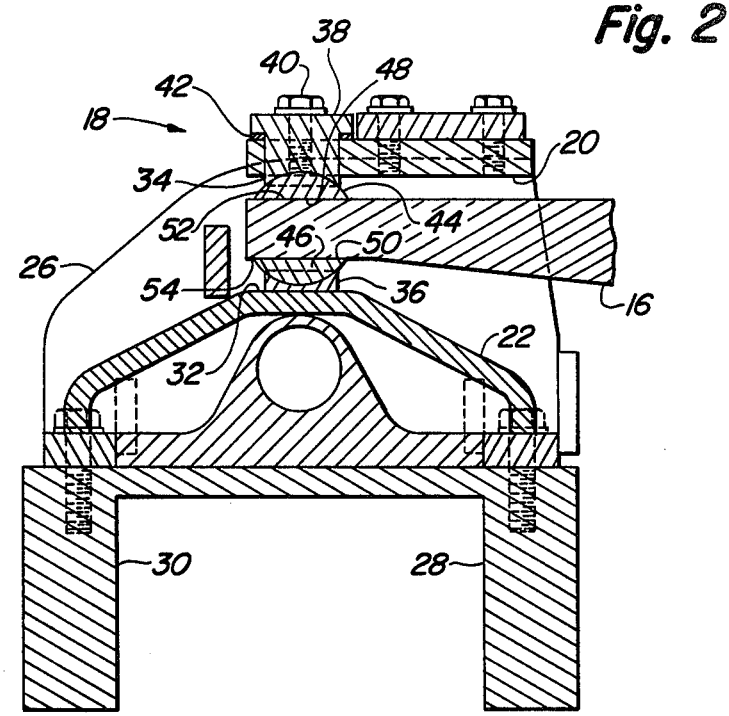
FIG. 2 is a front elevational view of a track frame to crossbar mounting constructed in accordance with a first embodiment of the present invention.
Figure 3:
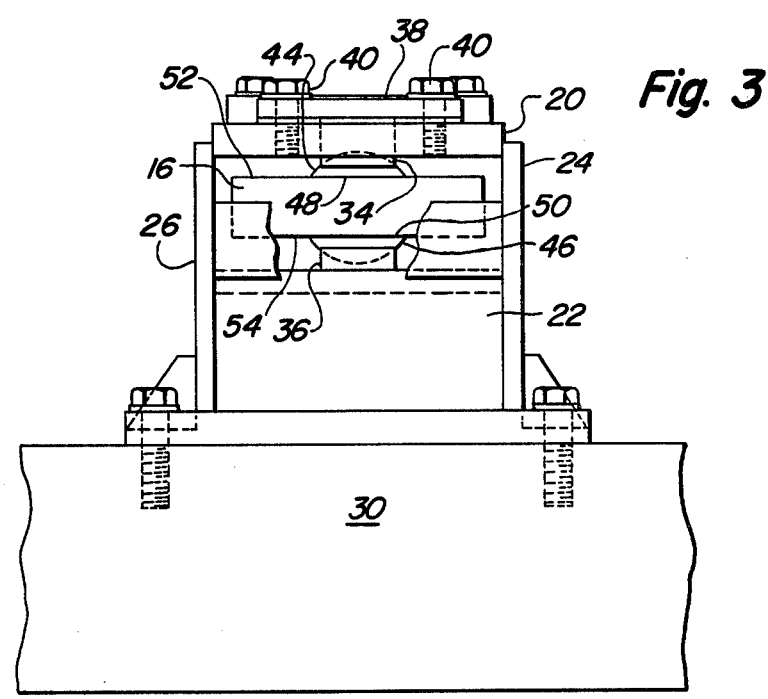
FIG. 3 is a side elevational view of the mounting shown in FIG. 2.

Referring now to FIGS. 2 and 3, a first embodiment of the mounting 8 is shown which includes vertically spaced, upper and lower support members 20 and 22. The upper support member 20 is in the form of a plate which extends horizontally between the tops of fore-and-aft spaced, vertical plates 24 and 26 which extend between a pair of transversely spaced beams 28 and 30 of the track frame 10. The lower support member 22 is in the form of an arched plate which extends between the plates 24 and 26 and has a central horizontal portion 32. The crossbar 16 has an outer end disposed centrally between the upper and lower support members 20 and 22 and is connected thereto by ball and socket connection means. Specifically, upper and lower ball socket segments 34 and 36 are respectively secured to the members 20 and 22, with the lower socket segment 36 being integrally fixed to the horizontal lower support portion 32 by weldment and with the upper segment 34 being received through an opening in the support member 20 and forming part of a plate 38 which overlies the support member 20 and is releasably secured thereto by a pair of fore-and-aft spaced cap screws 40. A stack of shims 42 is interposed between the plate 38 and the support member 20 for adjusting the socket segment 34 towards and away from the segement 36 to compensate for tolerance and wear of the ball and socket joint means. Respectively received in the ball socket segements 34 and 36 are upper and lower ball segements 44 and 46 having respective planar surfaces 48 and 50 slidably engaged with parallel upper and lower planar surfaces 52 and 54 of the crossbar end.

Thus, it will be appreciated that as the track frame 10 and crossbar 16 swing about their respective pivot axes that the bell segments 44 and 46 will move universally within the ball socket segments 34 and 36 and the end of the crossbar 16 will slide fore-and-aft and sideways upon the planar surfaces of the ball segements.

Figure 4:
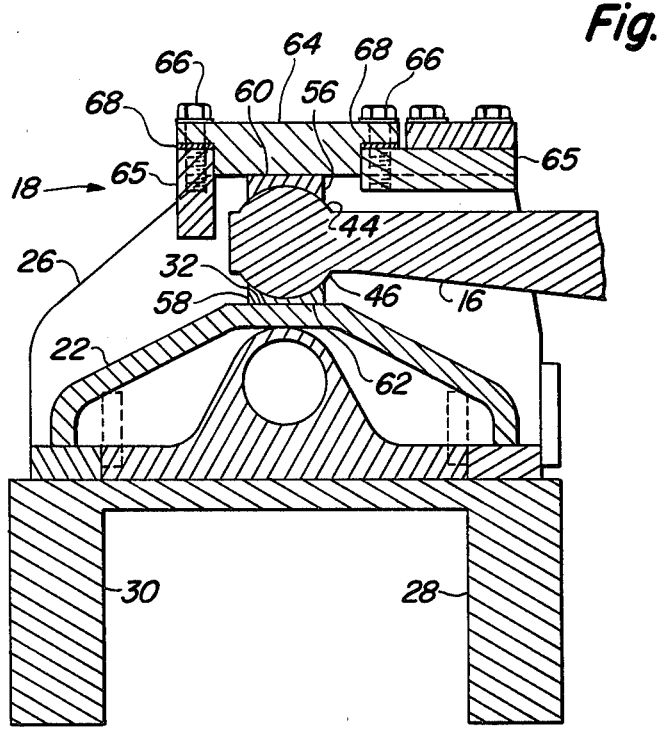
FIG. 4 is a view similar to FIG. 2, but showing a second embodiment of the present invention.
Figure 5:
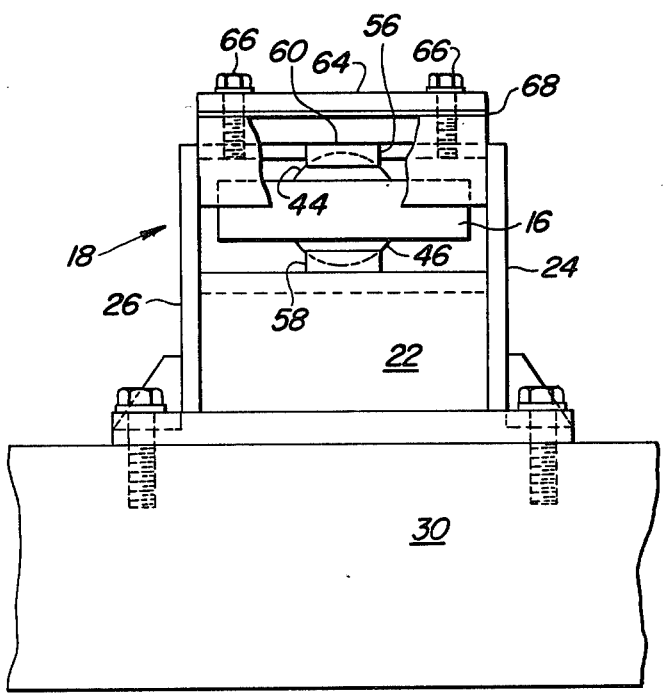
FIG. 5 is a side elevational view of the mounting shown in FIG. 4.

Referring now to FIGS. 4 and 5, there is shown a second embodiment of the mounting 18 wherein like numerals are used to designate parts which are like those described above. Specifically, the ball segments 44 and 46 of this specie are welded to or formed as an integral part of the end of the crossbar 16 and are respectively received in ball socket segments 56 and 58. The socket segments 56 and 58 have respective planar surfaces 60 and 62 respectively slidably engaged with a planar surface of a bearing plate 64, releasably secured to the upper support structure 65 by cap screws 66, and with the planar surface of the central portion 32 of the lower support member 22. A stack of shims 68 is interposed between the plate 64 and the support structure 65 and serves to permit the plate 64 to be adjusted toward and away from the lower support portion 32 so as to compensate for tolerances and wear. Like the first described embodiment, the ball segments move universally in the ball socket segments when the track frame 10 and crossbar 16 pivot about their respective connections with the crawler main frame. Now, however, the ball and socket segments move together with the end of the crossbar 16 with the socket segments sliding on the bearing plate 64 and the lower support member 22 to permit relative fore-and-aft and sideways movement between the crossbar and the track frame.

Figure 6:
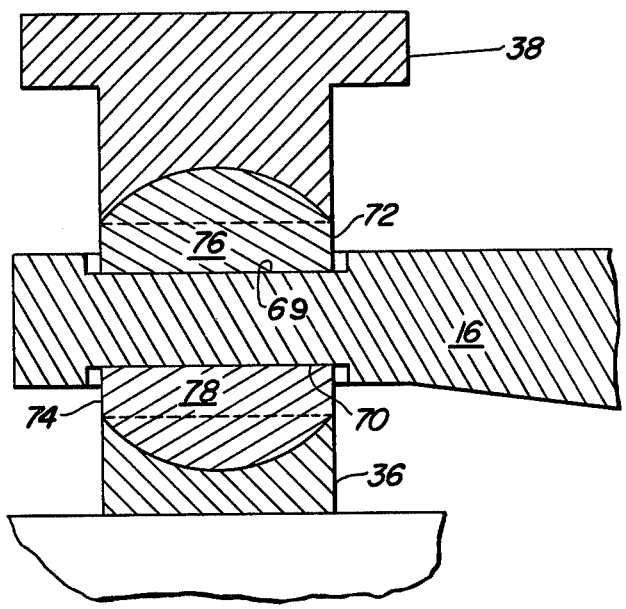
FIGS. 6 and 7 are vertical sectional views showing variants of the crossbar end and ball segments shown in FIGS. 2 and 4 respectively.

Referring now to FIG. 6, therein is shown an embodiment of the invention similar to that in FIG. 2 but which is particularly suited for transferring side loads from one track frame to the tractor main frame and the other track frame. Specifically, the crossbar 16 shown here has upper and lower cylindrical recesses 69 and 70, respectively, formed in the upper and lower surfaces thereof. Received in the recesses 69 and 70 are respective cylindrical portions 72 and 74 of upper and lower ball segments 76 and 78. The diameter of the recesses 69 and 70 exceeds that of the ball segment portions 72 and 74 by an amount sufficient to allow free sliding movement of the ball segments relative to the bar when the track frame swings about the axis 14. However, when the track frame experiences a side load tending to deflect the forward end thereof, the movement of the frame will bring the ball segments into contact with the walls of the recesses in the crossbar and the side load will thus be transferred to the tractor main frame and to the opposite track frame. Such transferring of these side loads greatly reduces the loads which would otherwise be imposed on a pair of diagonal braces 80 and 82 which are respectively joined to inner surfaces of the track frames 10 and 12 and have respective rearwardly extending arms 84 and 86 journalled on a shaft 88 located on the axis 14.

Figure 7:
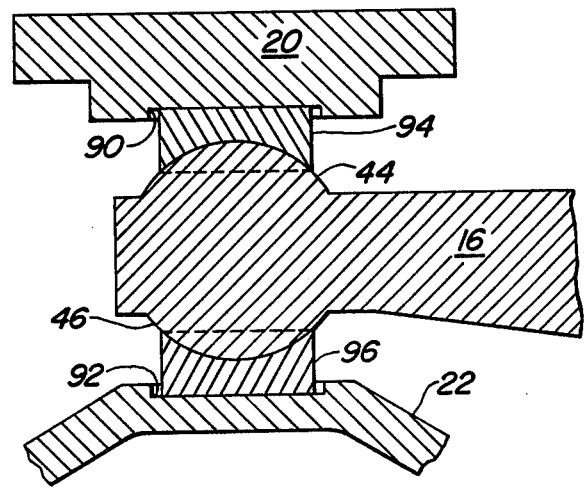

Referring now to FIG. 7, therein is shown an embodiment similar to that in FIG. 4 but being capable of transferring side loads imposed on one track frame to the tractor main frame and the other side frame. Specifically, the upper and lower support members 20 and 22 are respectively provided with cylindrical recesses 90 and 92. Loosely received in the recesses 90 and 92 are respective cylindrical portions of upper and lower ball socket segments 94 and 96, respectively. The amount of looseness is chosen so as to permit free sliding movement of the ball socket segments 94 and 96 relative to the support members 20 and 22 during vertical swinging movement of the track frame about the axis 14. However, upon a side load being imposed on the forward portion of the track frame, the latter will move sideways only an amount necessary to bring the segments 94 and 96 into contact with the walls of the recesses 90 and 92, the load then being transferred to the tractor main frame and the opposite track frame.

It can be seen that in all embodiments of the invention the center of curvature of the ball and socket segments is located centrally between upper and lower surfaces of a respective end of the crossbar 16. This ensures that universal pivotal movement may take place without binding.

The operation of the invention is thought to be evident from the foregoing description and is not reiterated here. Suffice it to say that the ball and socket joint means of the various embodiments operate to permit relative universal pivoting and sliding movements between the track frame 10 and the crossbar 16 without requiring precise tolerances to be kept in order for the joint means to operate satisfactorily.

I claim:

1. A mounting universally connecting an end of a front crossbar of a crawler tractor to a track frame, comprising: upper and lower support members fixed to said frame and respectively located above and below said end of the crossbar; one of upper and lower sides of said end of the crossbar, and said upper and lower support members being provided with a first pair of recesses respectively having bottoms defining a first pair of planar bearing surfaces; and ball and socket connection means interposed between said end of the crossbar and said upper and lower support members and including respective portions loosely received in said recesses and defining a second pair of planar bearing surfaces respectively slidably engaged with said first pair of bearing surfaces for permitting relative fore-and-aft and transverse movement between the track frame and the crossbar at said mounting.

2. The mounting defined in claim 1 wherein said ball and socket connection means includes upper and lower ball socket segments respectively secured to the upper and lower support members and opening towards each other; upper and lower ball segments respectively received in said upper and lower ball socket segments and being respectively provided with said second pair of planar bearing surfaces; and said end of the crossbar being provided at opposite sides with said pair of recesses.

3. The mounting defined in claim 2 wherein said upper ball socket segment is formed integrally with a plate; and adjustable, releasable securing means connecting the plate to said upper support member for disposing the upper ball socket segment at a selected distance away from said lower ball socket segment whereby adjustments may be made to compensate for tolerance and wear.

4. The mounting defined in claim 3 wherein said securing means comprises a pair of threaded fasteners received in said plate and upper support member and a plurality of shims received on the fasteners and interposed between said plate and the upper support member.

5. The mounting defined in claim 1 wherein said ball and socket connection means comprises upper and lower, oppositely projecting ball segments fixed to opposite sides of said end of the crossbar; upper and lower ball socket segments respectively received on said upper and lower ball segments and respectively having oppositely facing bearing surfaces defining said second pair of surfaces; and said upper and lower support members being respectively provided with said pair of recesses.

* * * * *